United States Patent Office 3,207,807
Patented Sept. 21, 1965

3,207,807
DEHYDROGENATION PROCESS
Laimonis Bajars and Russell M. Mantell, Princeton, N.J., assignors to Petro-Tex Chemical Corporation, Houston, Tex., a corporation of Delaware
No Drawing. Filed May 28, 1962, Ser. No. 197,885
18 Claims. (Cl. 260—680)

This application is a continuation-in-part of our earlier filed application, Serial Number 856,339, filed December 1, 1959, now abandoned.

This invention relates to a process for dehydrogenating organic compounds and relates more particularly to the dehydrogenation of aliphatic hydrocarbons at elevated temperatures in the presence of oxygen and bromine.

The dehydrogenation of aliphatic hydrocarbons such as butenes to butadiene is accomplished commercially by passing butene at high temperatures over various solid catalysts. Over modified iron oxides catalysts butene is converted to butadiene at conversions of about 25 percent and yields of about 19 percent in the presence of steam at flow rates of about 300 v./v./hr. While these yields are commercial, it has been a continuing object of those skilled in the art to provide processes with higher yields of butadiene and other unsaturated aliphatic hydrocarbons.

We have now discovered that greatly improved yields of unsaturated aliphatic hydrocarbons are obtained by dehydrogenating in the vapor phase at elevated temperatures aliphatic hydrocarbons in admixture with oxygen and bromine in the presence of certain metals or compounds thereof under conditions such that the equivalent partial pressure of the hydrocarbons to be dehydrogenated is less than one-half atmosphere.

The invention is suitably carried out, for example, by reacting butene with more than about 0.001 mole of molecular bromine fed as $Br_2$, or the equivalent amount of a bromine liberating compound, per mol of butene and at least one-fourth mol of oxygen per mol of butene at a temperature of at least 400° C. at a butene partial pressure equivalent to below 10 inches mercury absolute, when the total pressure is one atmosphere, with a catalyst comprising atoms selected from the group consisting of atoms of copper, zinc, cadmium, tin, bismuth or antimony.

According to this invention high yields, conversions and selectivities of the unsaturated product are obtained even when using low concentrations of bromine. High yields, conversions and selectivities are obtained at relatively low inlet reactor temperatures. Not only are the high selectivities and conversions of economic advantage for efficient utilization of feedstock, but straightforward and efficient purification of the desired product is accomplished because of the high yields, selectivities and conversions as compared to prior art processes. An additional advantage is that the catalyst is not easily coated with carbon as in some prior art processes, and therefore the catalyst may be considered to be autoregenerative in this process. The process requires little, if any, energy input and it is an advantage that the process may be operated adiabatically.

One essential feature of the novel process of this invention is the use of certain metals and their compounds. These materials may be considered as catalysts for the reaction although their function and mode of operation is not completely understood. A variety of metals and active compounds thereof such as inorganic salts, oxides and hydroxides have been found to be effective in attaining high conversion, selectivity and yield of unsaturated hydrocarbons in accordance with the process of this invention. Materials such as the following may be successfully used to dehydrogenate aliphatic hydrocarbons to obtain high yields of unsaturated hydrocarbons such as butadience-1,3 and isoprene from butene and methyl butene under conditions defined hereinafter: cuprous bromide, cupric bromide, cuprous chloride, cuprous fluoride, cuprous iodide, cuprous oxide, cupric oxide, cuprous silicide, cuprous sulfide, cupric phosphate, elemental zinc, zinc arsenide, zinc borate, zinc fluoride, zinc gallate, zinc oxide, zinc ortho phosphate, zinc phosphide, zinc orthosilicate, zinc metasilicate, zinc sulfide, zinc thiocyanate, elemental bismuth, bismuth trioxide, bismuth oxychloride, stannous oxide, stannic oxide, stannous sulfide, elemental antimony, antimony trioxide, antimony tetraoxide, cadmium fluoride, cadmium oxide, cadmium orthophosphate, cadmium meta silicate, cadmium sulfate, and the like. Mixtures of the materials and the like in any combination of two or more are also useful.

In general, atoms of the metals of the Periodic Table [1] Groups IIB, VA, copper, tin and mixtures thereof are effective in the process of this invention. The catalytic atoms may be present in various forms such as the elemental metal, or as oxides, salts or hydroxides of the atoms. Many of these metals, salts and hydroxides may change during the preparation of the catalyst, during heating in a reactor prior to use in the process of this invention, or are converted to another form under the described reaction conditions, but such materials still function as an effective compound in the defined process to give increased yields of unsaturated product. Most metals, nitrates, nitrites, carbonates, hydroxides, acetates, sulfites, silicates, sulfides and the like are probably converted to the corresponding oxide or bromide under the reaction conditions defined herein. For instance, zinc hydroxide may be charged to the reactor and under the conditions of reaction probably will be converted to zinc oxide. Thus, in the claims and specification when reference is made to the catalyst being a metal compound such as a particular metal oxide or halide, this is intended to include the presence of these oxides or halides regardless of the source; for example, the oxides or halides introduced to the reactor as such or the oxides or halides formed during the course of the reaction would both be included. Such salts as the phosphates, sulfates, halides, some carbonates, and hydroxides and the like, of the defined metal groups, which are normally stable at the defined reaction temperatures are likewise effective under the conditions of the described reaction. Particularly effective in the process of this invention are the defined metals and their oxides, halides and phosphates. In addition, any metal or compound thereof of these groups which are convertible to or are converted under the described reaction conditions to an active catalytic state as the metal, oxide or salt thereof are likewise effective in the process of this invention. Thus, the atoms of the defined catalytic metallic elements are introduced into the reactor in any manner wherein the metallic atoms will be present to catalyze the reaction. Generally the catalytic atoms will be introduced into the reactor as a compound of the metal which, under the conditions of reaction, has a boiling point higher than the temperature of reaction, such as a boiling point of at least 600° C. or 700° C., or may be introduced as a compound which will be converted to a compound which has a boiling point higher than the temperature of reaction. The oxides of the defined metal atoms represent a useful class of materials, since they are inexpensive and are readily formed in situ from metals, salts and hydroxides. Although a great variety of metals and compounds have been found to be useful in the process of this invention, certain of the metals and metal compounds are preferred. Preferred metals

---

[1] All references in this application to the Periodic Table are as found on pages 400–401 of the 39th edition (1957–1958) of the Handbook of Chemistry and Physics (Chemical Rubber Publishing Company).

and compounds thereof are those of copper, zinc, cadmium, bismuth, antimony, tin and mixtures thereof.

In the above descriptions of catalyst compositions, the composition described is that of the surface which is exposed in the dehydrogenation zone to the reactants. That is, if a catalyst carrier is used, the composition described as the catalyst refers to the composition of the surface and not to the total composition of the surface coating plus carrier. The catalytic compositions are intimate combinations or mixtures of the ingredients. These ingredients may or may not be chemically combined or alloyed. Inert catalyst binding agents or fillers may be used, but these will not ordinarily exceed about 50 percent or 65 percent by weight of the catalytic surface. The weight percent of the defined catalytic atoms will generally be at least 20 percent, and preferably at least 35 percent of the composition of the catalyst surface.

The amount of solid catalyst utilized may be varied depending upon such variables as the activity of the catalyst, the amount of bromine and oxygen used, the flow rates of reactants and the temperature of reaction. When a solid catalyst is used, the amount of catalyst will be present in an amount of greater than 10 square feet of catalyst surface per cubic foot of reaction zone containing catalyst. Better results may be observed at ratios such as at least 25 or 45 square feet of catalyst surface per cubic foot of reaction zone. The catalyst is more effectively utilized when the catalyst is present in an amount of at least 75 square feet of catalyst surface per cubic foot of reaction zone containing catalyst, and preferably the ratio of catalyst surface to volume will be at least 120 square feet of catalyst surface per cubic foot of reaction zone containing catalyst.

Excellent results have been obtained by packing the reactor with catalyst particles as the method of introducing the catalytic surface. The size of the catalyst particles may vary widely but generally the maximum particles size will at least pass throuyh a Tyler Standard screen which has an opening of 2 inches, and generally the largest particles of catalyst will pass through a Tyler screen with one inch openings. Very small particle size carriers may be utilized with the only practical objection being that extremely small particles cause excessive pressure drops across the reactor. In order to avoid high pressure drops across the reactor generally at least 50 percent by weight of the catalyst will be retained by a 10 mesh Tyler Standard screen which has openings of 1/16 inch. However, if a fluid bed reactor is utilized, catalyst particles may be quite small, such as from about 10 to 300 microns. Thus, the particle size when particles are used preferably will be from about 10 microns to a particle size which will pass through a Tyler screen with openings of 2 inches. If a carrier is used the catalyst may be deposited on the carrier by methods known in the art such as by preparing an aqueous solution or dispersion of the metal or metal compound, mixing the carrier with the solution or dispersion until the active ingredients are coated on the carrier. The coated particles may then be dried, for example, in an oven at about 110° C. Various other methods of catalyst preparation known to those skilled in the art may be used. When carriers are utilized, these will be approximately of the same size as the final coated catalyst particle, that is, for fixed bed processes the carriers will generally be retained on 10 mesh Tyler screen and will pass through a Tyler screen with openings of 2 inches. Very useful carriers are Alundum, silicon carbide, Carborundum, pumice, kieselguhr, asbestos, and the like. The Alundums or other alumina carriers are particularly useful. When carriers are used, the amount of catalyst on the carrier will generally be in the range of about 5 to 75 weight percent of the total weight of the active catalytic material plus carrier. The carriers may be of a variety of shapes, including irregular shapes, cylinders or spheres. Another method for introducing the required surface is to utilize as a reactor a small diameter tube wherein the tube wall is catalytic or is coated with catalytic material. If the tube wall is the only source of catalyst generally the tube will be of an internal diameter of no greater than one inch such as less than ¾ inch in diameter or preferably will be no greater than about ½ inch in diameter. Other methods may be utilized to introduce the catalytic surface such as by the use of rods, wires, mesh or shreds and the like of catalytic material. The technique of utilizing fluid beds lends itself well to the process of this invention.

The total pressure on systems employing the process of this invention normally will be at or in excess of atmospheric pressure, although sub-atmospheric pressure can be used. Higher pressures, such as about 100 or 200 p.s.i.g. may be used. However, the initial partial pressure of the hydrocarbon to be dehydrogenated is an important and critical feature of the invention. The partial pressure of the hydrocarbon to be dehydrogenated should be equivalent to below about 10 inches mercury absolute, or ⅓ atmosphere, when the total pressure is one atmosphere to realize the advantages of this invention. Also because the initial partial pressure of the hydrocarbon to be dehydrogenated is equivalent to less than about 10 inches of mercury at a total pressure of one atmosphere, the combined partial pressure of the hydrocarbon to be dehydrogenated plus the dehydrogenated hydrocarbon will also be equivalent to less than about 10 inches of mercury. For example, if butene is being dehydrogenated to butadiene, at no time will the combined partial pressure of the butene and butadiene be greater than equivalent to about 10 inches of mercury at a total pressure of one atmosphere. Preferably the hydrocarbon to be dehydrogenated should be maintained at a partial pressure equivalent to less than one-third the total pressure, such as no greater than six inches or no greater than four inches of mercury, at a total pressure of one atmosphere. The desired pressure is obtained and maintained by techniques known to those skilled in the art, including vacuum operations, or by using helium, organic compounds, nitrogen, steam and the like, or by a combination of these methods. Steam is particularly advantageous and it is surprising that the desired reactions to produce high yields of product are effected in the presence of large amounts of steam. When steam is employed, the ratio of steam to hydrocarbon to be dehydrogenated is normally within the range of about 4 to 20 or 30 mols of steam per mol of hydrocarbon, and generally will be between 8 and 15 mols of steam per mol of hydrocarbon. When air is employed as the source of oxygen, then less steam normally will be required. The degree of dilution of the reactants with steam, nitrogen and the like is related to keeping the partial pressure of hydrocarbon to be dehydrogenated in the system equivalent to preferably below 10 inches of mercury at one atmosphere total pressure. For example, in a mixture of one mol of butene, three mols of steam and one mol of oxygen under a total pressure of one atmosphere the butene would have an absolute pressure of one-fifth of the total pressure, or roughly six inches of mercury absolute pressure. Equivalent to this six inches of mercury butene absolute pressure at atmospheric pressure would be pure butene under a vacuum such that the total pressure is six inches of mercury absolute. A combination of a diluent such as steam together with a vacuum may be utilized to achieve the desired partial pressure of the hydrocarbon. For the purpose of this invention, also equivalent to the six inches of mercury butene absolute pressure at atmospheric pressure would be the same mixture of one mol of butene, three mols of steam and one mol of oxygen under a total pressure greater than atmospheric, for example, a total pressure of 15 or 20 inches mercury above atmospheric. Thus, when the total pressure on the reaction zone is greater than one atmosphere, the absolute values for the pressure of butene will be increased in direct proportion to the increase in total pressure above one atmosphere. Another feature of this invention is that the combined partial pressure of the hydrocarbon to be dehydrogenated plus the bromine liberating material will also be equivalent to less than 10 inches of mercury, and preferably less than 6 or 4 inches of mercury, at a total pressure of one atmosphere. The lower limit of hydrocarbon partial pressure will be dictated by commercial considerations and practically will be greater than about 0.1 inch mercury.

The minimum amount of oxygen used generally will be from at least about one-fourth mol of oxygen per mol of hydrocarbon being dehydrogenated to about 2 mols or more of oxygen per mol of hydrocarbon to be dehydrogenated. As much as 5 mols of oxygen or higher have been employed. High selectivity has been obtained when amounts of oxygen from greater than 0.25 to about 1 mol of oxygen per mol of hydrocarbon were employed. High conversions have been obtained when the amount of oxygen was varied from about 0.75 to about 1.75 mols of oxygen per mol of hydrocarbon. Maximum yields of diolefin product have been obtained with amounts of oxygen from about 0.4 to about 1.25 mols of oxygen per mol of hydrocarbon, so that within the rang of 0.25 to 2.0, and preferably 0.3 or 0.4 to 1.75 total mols of oxygen per mol of hydrocarbon to be dehydrogenated, economic and operational considerations will dictate the exact molar ratio of oxygen to hydrocarbon used. A particularly useful range is from about 0.4 to one mol of oxygen per mol of hydrocarbon. Oxygen is supplied to the system as pure oxygen or the oxygen may be diluted with inert gases such as helium, carbon dioxide and nitrogen. Air is entirely satisfactory as the source of oxygen. In relation to bromine, the amount of oxygen employed will be greater than 1 or 1.5 mol of oxygen per atom of bromine. Usually the ratio of mols of oxygen to atoms of bromine will be from 2.5 to 250 and preferably the ratio will be between 8 and 150 mols of oxygen per atom of bromine. The ratio of the mols of the oxygen to the mols of the bromine may suitably be at least 5.0.

Bromine employed in the process of this invention may be bromine itself, hydrogen bromide, organic bromides or any bromine containing compound which decomposes or volatizes under the reaction conditions defined herein to liberate or provide the specified amount of free bromine or hydrogen bromide. Such organic bromine compounds may include alkyl bromides such as aliphatic bromides of from one to six carbon atoms including ethyl bromide, propyl bromide, bromoform, butyl bromide, amyl bromide, hexyl bromide, and the like. Both primary, secondary and tertiary alkyl bromides may be employed. Similarly, aromatic and heterocyclic bromides may be employed. It is an advantage of this invention that the hydrogen bromide leaving the reactor may be recycled to the stream entering the dehydrogenation zone without the necessity of processing or converting it to another form. It should be understood that when a quantity of bromine is referred to herein, both in the specification and claims, that the equivalent amount of elemental bromine is understood, regardless of the initial source of the bromine.

Amounts of bromine as small as about 0.001 mol of bromine per mol of hydrocarbon to be dehydrogenated have been found to be effective in the process of this invention. The bromine concentration normally will be varied from about 0.01 mol to about 0.2 mol of bromine per mol of olefin. Although amounts of bromine in excess of about 0.2 mole may be employed, such as 0.5 mol, these larger amounts are not preferred. Amounts of bromine, or the equivalent bromine-liberating compound, of about 0.005 mol to about 0.05 or up to 0.09 or 0.1 mol per mol of hydrocarbon to be dehydrogenated are preferred. Preferably, the bromine will be present in an amount no greater than 10 mol percent of the total feed to the reactor. Also preferably, the bromine will be present from about 2 to 25 weight percent of the hydrocarbon to be dehydrogenated.

The temperature at which the reaction is conducted is from above about 400° C. to temperatures as high as about 800° C. Excellent results are ordinarily obtained within the range of about 475° C. to about 725° C., such as up to 750° C. Butadiene-1,3 has been obtained in good yield from butene at about 550° C. to about 750° C., and isoprene has been obtained in good yield from methyl butene at temperatures from about 425° C. to 750° C. An advantage of this invention is the extremely wide latitude of reaction temperatures.

The flow rates of the hydrocarbon to be dehydrogenated may be varied quite widely and can be readily established by those skilled in the art. Good results have been obtained with hydrocarbon to be dehydrogenated flow rates ranging from about ¼ to 4 liquid volumes calculated at standard conditions of 25° C. and 760 mm. of mercury of hydrocarbon to be dehydrogenated per volume of reactor zone packed with active surface per hour (liquid v./v./hr.). The residence or contact time of the reactants in the reaction zone under any given set of reaction conditions depends upon all the factors involved in the reaction. Contact times ranging from about 0.1 to about 5 to 10 seconds have been found to be quite satisfactory. However, a wider range of residence times may be employed which may be as low as about 0.01 second to as long as several minutes, although such long reaction times are not preferred. Normally the shortest contact time consonant with optimum yields and operating conditions is desired, for example 0.1 to 1 second. Residence time is the calculated dwell time of the reaction mixture in the reaction zone assuming the mols of product mixture are equivalent to the mols of feed mixture. For the purpose of calculation the reaction zone is the portion of the reactor packed with the active surface.

A variety of reactor types may be employed. For example, tubular reactors of small diameter made of metals or alloys of the metals described above as catalysts for the reaction may be employed. Large diameter reactors will require loading with an active material to provide the required surface for efficient operation. Fixed bed reactors containing the metal or metal compound catalysts in the form of grids, screens or pellets, and the like may also be used. In any of these reactors suitable means for reactor temperature control may be provided. Fluid and moving bed systems are readily applied to the processes of this invention.

The manner of mixing the bromine or bromine compound, hydrocarbon, oxygen containing gas and steam, if employed, is subject to some choice. In normal operations the hydrocarbon may be preheated and mixed with steam and preheated oxygen or air and bromine or hydrogen bromide mixed therewith prior to passing the stream in vapor phase over the catalyst bed. Hydrogen bromide or a source of bromine solution may be mixed with steam or air prior to reaction. Any of the reactants may be split and added incrementally. For example, part of the bromine may be mixed with the hydrocarbon to be dehydrogenated and the oxygen. The mixture may then be heated to effect some dehydrogenation and thereafter the remainder of the bromine added to effect further dehydrogenation. The effluent reaction product from the reactor is cooled and then passed to means for removing bromine such as in a caustic scrubber. The hydrocarbon product is then suitably purified as by fractionation to obtain the desired high purity unsaturated product.

Hydrocarbons effectively dehydrogenated according to the process of this invention are selected from the group consisting of mono-olefins of 4 to 6 carbon atoms, saturated aliphatic hydrocarbons of 4 to 5 carbon atoms and mixtures thereof. Examples of feed materials are butene-1, butene-2, 2-methyl butene-3, 2-methyl butene-1, 2-methyl butene-2, n-butane, methyl butane, 2-methyl pentene-1 and 2-methyl pentene-2. For example, n-butane, may be converted to a mixture of butene-1, butene-2, butadiene-1,3 and a mixture of n-butane and butene-2 may be converted to butadiene-1,3 or a mixture of butadiene-1,3 together with some butene-2 and butene-1. The process of this invention is particularly effective in dehydrogenating aliphatic hydrocarbons to provide a product wherein the major unsaturated product has the same number of carbon atoms as the feed hydrocarbon.

In the following examples will be found specific embodiments of the invention and details employed in the practice of the invention. Percent conversion refers to mols of olefin consumed per 100 mols of olefin fed to the reactor, percent selectivity represents the mols of diolefin formed per 100 mols of olefin consumed, and percent yield refers to the mols of diolefin formed per mol of olefin fed. All quantities of bromine expressed are calculated as mols of $Br_2$. In all of the examples unless expressed otherwise: the runs were made in a Vycor[1] reactor which was one inch internal diameter; the overall length of the reactor was about 36 inches with the middle 24 inches of the reactor being encompassed by a heating furnace; the bottom 6 inches of the reactor was empty; at the top of this 6 inches was a retaining plate, and on top of this plate were placed 6 inches of the catalyst particles; the remainder of the reactor was filled with 6 mm. x 6 mm. inert Vycor Raschig rings; the actives of the catalyst were coated on 6 mm. x 6 mm. inert Vycor Raschig rings by depositing a water slurry of the active material on the rings followed by drying overnight at about 110° C., and the flow rates were calculated on the volume of the 6 inch long by 1 inch diameter portion of the reactor which was filled with catalyst particles. These examples are intended as illustrative only, since numerous modifications and variations in accordance with the disclosure herein will be apparent to those skilled in the art.

Example 1

The Vycor reactor was packed with Vycor Raschig rings having deposited thereon $Bi_2O_3$. At a 700° C. maximum bed temperature, butene-2 was dehydrogenated to butadiene-1,3. The flow rate of butene-2 was maintained at 1 liquid volume of butene-2 per volume of reactor packed with catalyst per hour (l.v./v./hr.). Oxygen and steam were also fed to the reactor in the same stream at a mol ratio of oxygen to butene-2 of 0.85, and a mol ratio of steam to butene-2 of 16. Hydrogen bromide was added to the inlet to the reactor as an aqueous solution containing 48 weight percent hydrogen bromide at a rate which was equivalent to 0.028 mol of bromine (calculated as $Br_2$) per mole of butene-2. The butene-2 and oxygen were added to the top of the reactor and the aqueous solution of hydrogen bromide was added to this stream as it entered the reactor. The steam was added separately in a line which was opposite the hydrogen bromide inlet line. The conversion of butene-2 was 85 mol percent, with 58 mol percent selectivity to butadiene. The resulting yield was 49 mol percent butadiene-1,3 based on the amount of butene-2 fed to the reactor. The reactor effluent was quenched with water and then scrubbed with caustic solution. The hydrocarbon stream was fractionated and the butadiene-1,3 was recovered. The catalyst was not coated with carbon.

Example 2

The procedure for Example 1 was repeated with the exception that $SnO_2$ was coated on the Raschig rings instead of the $Bi_2O_3$. The conversion of butene-2 was 78 mol percent, the selectivity was 52 mol percent and the yield of butadiene-1,3 was 41 mol percent based on the mols of butene-2 fed.

Example 3

The same general procedure of Example 1 was repeated. The catalyst used in this example was ZnO deposited on Vycor Raschig rings. The ratio of steam to butene-2 was 12.5, the ratio of oxygen to butene-2 was 1.0 and the ratio of bromine (calculated as $Br_2$ but added as hydrogen bromide) was 0.03 mol of $Br_2$ per mol of butene-2. The flow rate was 1 l.v./v./hr. as in Example 1. With the maximum temperature in the reactor of 650° C. the conversion of butene-2 was 40 mol percent, the selectivity was 86 mol percent and the yield of butadiene-1,3 was 34 mol percent.

Example 4

Example 3 was repeated with the exception that the ratio of hydrogen bromide to butene-2 was equivalent to 0.06 mol $Br_2$ per mol of butene-2. At a maximum temperature in the bed of 700° C., the conversion was 52 mol percent, the selectivity was 83 mol percent and the yield of butadiene-1,3 was 43 mol percent.

Example 5

The procedure of Example 3 was repeated with the exception that the catalyst used was $Cu_2O$ coated on Vycor Raschig rings. The molar ratio of hydrogen bromide was equivalent to 0.03 mol of $Br_2$ per mol of butene-2, as in Example 3. At a maximum bed temperature of 600° C., the conversion was 47 mol percent, selectivity was 84 mol percent and the yield of butadiene-1,3 was 39 mol percent.

As compared with processes previously suggested in the prior art, the process of this invention has numerous advantages in addition to those enumerated above. For example, the bromine by-product from the reactor such as hydrogen bromide may be readily separated from the product and may be recycled to the reactor without any further processing. The process gives high selectivities to the unsaturated product and consequently only low amounts of impurities such as oxygenated by-products or tars and polymers are produced. Less corrosion results from this process as compared to some previously suggested processes. The availability and low cost of bromine and bromine compounds contributes to making the process a highly efficient commercial process.

We claim:

1. The method for dehydrogenating aliphatic hydrocarbons which comprises heating in the vapor phase at a temperature greater than 400° C. an aliphatic hydrocarbon with oxygen in a molar ratio of greater than one-fourth mol of oxygen per mol of said hydrocarbon, at least about 0.005 mol of bromine per mol of said hydrocarbon, the initial partial pressure of said hydrocarbon being equivalent to less than about one-third atmosphere at one atmosphere total pressure, with an essentially solid catalyst comprising a catalytic surface having as its main active constituent a member selected from the group consisting of metals, oxides, salts, and hydroxides of Zn, Cd, Sb, Bi, Cu, Sn, and mixtures thereof, the ratio of the mols of said oxygen to the atoms of said bromine being greater than one.

2. The method for dehydrogenating aliphatic hydrocarbons which comprises heating in the vapor phase at a temperature of about 425° C. to about 750° C. an aliphatic hydrocarbon selected from the group consisting of mono-olefins of 4 to 6 carbon atoms and saturated hydrocarbons of 4 to 5 carbon atoms and mixtures thereof, with oxygen in a molar ratio of above one-fourth to two mols of oxygen per mol of said hydrocarbon, from about 0.005 to less than 0.2 mol of bromine per mol of said hydrocarbon, and steam in quantities so that partial pressure of said hydrocarbon is equivalent to less than 10 inches mercury at one atmosphere total pressure, with ---
[1] Vycor is the trade name of Corning Glass Works, Corning, N.Y., and is composed of approximately 96 percent silica with the remainder being essentially $B_2O_3$.

an essentially solid catalyst comprising a catalytic surface having as its main active constituent a member selected from the group consisting of metals, oxides, salts, and hydroxides of Zn, Cd, Sb, Bi, Cu, Sn, and mixtures thereof, the ratio of the mols of said oxygen to the atoms of said bromine being greater than one.

3. The method for preparing aliphatic diolefins which comprises heating in the vapor phase at a temperature of about 400° C. to about 800° C. a mono-ethylenically unsaturated hydrocarbon of 4 to 6 carbon atoms with oxygen in a molar ratio of above about one-fourth mol of oxygen per mol of said unsaturated hydrocarbon, at least about 0.005 mol of bromine per mol of said unsaturated hydrocarbon, the initial pressure of said unsaturated hydrocarbon being equivalent to less than one-third atmosphere at one atmosphere total pressure, with an essentially solid catalyst comprising a catalytic surface having as its main active constituent a member selected from the group consisting of metals, oxides, salts, and hydroxides of Zn, Cd, Sb, Bi, Cu, Sn, and mixtures thereof, the ratio of the mols of said oxygen to the atoms of said bromine being greater than one.

4. The method for preparing butadiene-1,3, and isoprene which comprises heating in the vapor phase at a temperature of about 425° C. to 750° C. the corresponding mono-olefin of the same number of carbon atoms selected from the group consisting of n-butene and methyl butene with oxygen in a molar ratio of about 0.4 to about 1.75 mols of oxygen per mol of said mono-olefin, bromine in a molar ratio of about 0.005 to 0.1 mol of bromine per mol of said mono-olefin, the partial pressure of said mono-olefin being equivalent to less than about 10 inches mercury at one atmosphere total pressure, with a catalyst selected from the group consisting of oxides of Zn, Cd, Sb, Bi, Cu, Sn, and mixtures thereof, the ratio of the mols of the said oxygen to the atoms of said bromine being greater than one.

5. The method for preparing butadiene-1,3 and isoprene which comprises heating in the vapor phase at a temperature of about 425° C. to 750° C. the corresponding mono-olefin of the same number of carbon atoms selected from the group consisting of n-butene and methyl butene with oxygen in a molar ratio of about 0.4 to about 1.25 mols of oxygen per mol of said mono-olefin and bromine in a molar ratio of about 0.005 to 0.09 mol of bromine per mol of said mono-olefin, the partial pressure of said mono-olefin being equivalent to less than about 10 inches mercury at one atmosphere total pressure, with an essentially solid catalyst comprising a catalytic surface having as its main active constituent a member selected from the group consisting of metals, oxides, salts, and hydroxides of Zn, Cd, Sb, Bi, Cu, Sn, and mixtures thereof, the ratio of the mols of said oxygen to the atoms of said bromine, being at least about 5.00

6. The method for preparing butadiene-1,3 and isoprene which comprises heating in the vapor phase at a temperature of about 450° C. to 750° C. the corresponding mono-olefin of the same number of carbon atoms selected from the group consisting of n-butene and methyl butene with oxygen in a molar ratio of about one-half to about one mol of oxygen per mol of said mono-olefin, bromine in a molar ratio of about 0.005 to 0.05 mol of bromine per mol of said mono-olefin and steam, the partial pressure of said mono-olefin being equivalent to less than about 6 inches mercury at one atmosphere total pressure, with a catalyst selected from the group consisting of oxides of Zn, Cd, Sb, Bi, Cu, Sn, and mixtures thereof.

7. The method for preparing butadiene-1,3 and isoprene which comprises heating in the vapor phase at a temperature of about 425° C. to 750° C. the corresponding mono-olefin of the same number of carbon atoms selected from the group consisting of n-butene and methyl butene with oxygen in a molar ratio of about 0.4 to about one mol of oxygen per mol of said mono-olefin, bromine in a molar ratio of about 0.005 to 0.1 mol of bromine per mol of said mono-olefin and steam in a molar ratio of about 4 to 30 mols of steam per mol of said mono-olefin, with an essentially solid catalyst comprising a catalytic surface having as its main active constitutent a member selected from the group consisting of metals, oxides, salts, and hydroxides of Zn, Cd, Sb, Bi, Cu, Sn, and mixtures thereof.

8. The method for preparing butadiene-1,3 which comprises heating in the vapor phase at a temperature of about 450° C. to 750° C. butene with oxygen in a molar ratio of about one-half to about one mol of oxygen per mol of butene, bromine in a molar ratio of about 0.005 to 0.1 mol of bromine per mol of butene and steam in a molar ratio of about 8 to 20 mols of steam per mol of butene, with an essentially solid catalyst comprising a catalytic surface having as its main active constituent a member selected from the group consisting of metals, oxides, salts, and hydroxides of Zn, Cd, Sb, Bi, Cu, Sn, and mixtures thereof.

9. The method for dehydrogenating aliphatic hydrocarbons which comprises heating in the vapor phase at a temperature of about 450° C. to 750° C. an aliphatic hydrocarbon selected from the group consisting of mono-olefins of 4 to 6 carbon atoms and saturated hydrocarbons of 4 to 5 carbon atoms and mixtures thereof with oxygen and bromine in an amount of greater than 0.005 mol of bromine per mol of said hydrocarbon with an essentially solid catalyst comprising a catalytic surface having as its main active constituent a member selected from the group consisting of metals, oxides, salts, and hydroxides of Zn, Cd, Sb, Bi, Cu, Sn, and mixtures thereof, the ratio of the mols of said oxygen to the atoms of said bromine being greater than 2.5, said hydrocarbon having a partial pressure equivalent to less than about 10 inches mercury at one atmosphere total pressure.

10. In a process for preparing aliphatic diolefins which comprises heating at a temperature above 425° C. a mono-olefinic hydrocarbon of 4 to 5 carbon atoms with oxygen and bromine, the improvement which comprises conducting the reaction with about one-fourth to about two mols of oxygen per mol of mono-olefinic hydrocarbon and greater than about 0.005 to 0.1 mol of bromine per mol of mono-olefinic hydrocarbon, with an essentially solid catalyst comprising a catalytic surface having as its main active constituent a member selected from the group consisting of metals, oxides, salts, and hydroxides of Zn, Cd, Sb, Bi, Cu, Sn, and mixtures thereof, said reaction being conducted with the combined partial pressure of said mono-olefinic hydrocarbon and bromine being equivalent to less than about 10 inches mercury at one atmosphere total pressure, the ratio of the mols of said oxygen to the atoms of said bromine being at least about 5.0.

11. The method for preparing butadiene-1,3 and isoprene which comprises heating in the vapor phase at a temperature of about 425° C. to 750° C. the corresponding mono-olefin of the same number of carbon atoms selected from the group consisting of n-butene and methyl butene with air in a molar ratio equivalent to about 0.4 to about 1.75 mol of oxygen per mol of said mono-olefin, bromine in a molar ratio of about 0.005 to 0.1 mol of bromine per mol of said mono-olefin and steam in a molar ratio of about 4 to 15 mols of steam per mol of said mono-olefin, with a catalyst selected from the group consisting of oxides of metal elements of the group consisting of Zn, Cd, Sb, Bi, Cu, Sn and mixtures thereof, the ratio of the mols of said oxygen to the atoms of said bromine being at least about 5.0.

12. A process according to claim 1 wherein the main active constituent is selected from the group consisting of copper, oxides of copper, salts of copper, hydroxides of copper, and mixtures thereof.

13. The method for dehydrogenating aliphatic hydrocarbons which comprises heating in the vapor phase at a temperature of above about 400° C. an aliphatic hydrocarbon of 4 to 6 carbon atoms with oxygen in a molar ratio of above about one-fourth mol of oxygen per mol of said aliphatic hydrocarbon, and bromine in amount of at least about 0.005 mol of bromine per mol of said aliphatic hydrocarbon with a catalyst comprising zinc, the ratio of the mols of said oxygen to the atoms of said bromine being greater than 2.5, the partial pressure of said aliphatic hydrocarbon being equivalent to less than about six inches mercury at one atmosphere total pressure.

14. The method for dehydrogenating aliphatic hydrocarbons which comprises heating in the vapor phase at a temperature of above about 400° C. an aliphatic hydrocarbon of 4 to 6 carbon atoms with oxygen in a molar ratio of above about one-fourth mol of oxygen per mol of said aliphatic hydrocarbon, and bromine in amount of at least about 0.005 mol of bromine per mol of said aliphatic hydrocarbon with a catalyst comprising bismuth, the ratio of the mols of said oxygen to the atoms of said bromine being greater than 2.5, the partial pressure of said aliphatic hydrocarbon being equivalent to less than about six inches mercury at one atmosphere total pressure.

15. The mthod for dehydrogenating aliphatic hydrocarbons which comprises heating in the vapor phase at a temperature of above about 400° C. an aliphatic hydrocarbon of 4 to 6 carbon atoms with oxygen in a molar ratio above about one-fourth mol of oxygen per mol of said aliphatic hydrocarbon, and bromine in amount of at least about 0.005 mol of bromine per mol of said aliphatic hydrocarbon with a catalyst comprising tin, the ratio of the mols of said oxygen to the atoms of said bromine being greater than 2.5, the partial pressure of said aliphatic hydrocarbon being equivalent to less than about six inches mercury at one atmosphere total pressure.

16. The method for dehydrogenating aliphatic hydrocarbons which comprises heating in the vapor phase at a temperature of above about 400° C. an aliphatic hydrocarbon of 4 to 6 carbon atoms with oxygen in a molar ratio of above about one-fourth mol of oxygen per mol of said aliphatic hydrocarbon, and bromine in amount of greater than about 0.005 mol of bromine per mol of said aliphatic hydrocarbon with a catalyst comprising zinc, the ratio of the mols of said oxygen to the atoms of said bromine being greater than 2.5, the partial pressure of said aliphatic hydrocarbon being equivalent to less than about six inches mercury at one atmosphere total pressure.

17. The method for dehydrogenating aliphatic hydrocarbons which comprises heating in the vapor phase at a temperature of above about 400° C. an aliphatic hydrocarbon of 4 to 6 carbon atoms with oxygen in a molar ratio of above about one-fourth mol of oxygen per mol of said aliphatic hydrocarbon, and bromine in amount of greater than about 0.05 mol of bromine per mol of said aliphatic hydrocarbon with a catalyst comprising bismuth, the ratio of the mols of said oxygen to the atoms of said bromine being greater than 2.5, the partial pressure of said aliphatic hydrocarbon being equivalent to less than about six inches mercury at one atmosphere total pressure.

18. The method for dehydrogenating aliphatic hydrocarbons which comprises heating in the vapor phase at a temperature of above about 400° C. an aliphatic hydrocarbon of 4 to 6 carbon atoms with oxygen in a molar ratio above about one-fourth mol of oxygen per mol of said aliphatic hydrocarbon, and bromine in amount of greater than about 0.005 mol of bromine per mol of said aliphatic hydrocarbon with a catalyst comprising tin, the ratio of the mols of said oxygen to the atoms of said bromine being greater than 2.5, the partial pressure of said aliphatic hydrocarbon being equivalent to less than about six inches mercury at one atmosphere total pressure.

References Cited by the Examiner

UNITED STATES PATENTS

| | | | |
|---|---|---|---|
| 2,301,668 | 11/42 | Pier et al. | 260—680 |
| 2,326,258 | 8/43 | Schmidt et al. | 260—680 |
| 2,327,174 | 8/43 | Cass | 260—654 |
| 2,370,513 | 2/45 | Amos et al. | 260—680 |
| 2,397,638 | 4/46 | Bell et al. | 208—7 |
| 2,399,488 | 4/46 | Hearne | 260—659 |
| 2,404,056 | 7/46 | Gorin et al. | 260—680 |
| 2,643,269 | 6/53 | Augustine et al. | 260—604 |
| 2,719,171 | 9/55 | Kalb | 260—486 |
| 2,890,253 | 6/59 | Mullineaux et al. | 260—673.5 |
| 2,898,386 | 8/59 | Raley et al. | 260—666 |
| 2,921,101 | 1/60 | Magovern | 260—680 |

FOREIGN PATENTS 777,010  6/57  Great Britain.

ALPHONSO D. SULLIVAN, *Primary Examiner.*